United States Patent [19]

Tanaka et al.

[11] Patent Number: 5,577,106
[45] Date of Patent: Nov. 19, 1996

[54] COMMUNICATION APPARATUS FOR USE WITH PUBLIC TELEPHONE NETWORK

[75] Inventors: Masahiro Tanaka; Masaharu Itado, both of Nara, Japan

[73] Assignee: Sharp Kabushiki Kaisha, Osaka, Japan

[21] Appl. No.: 399,472

[22] Filed: Mar. 7, 1995

[30] Foreign Application Priority Data

Mar. 11, 1994 [JP] Japan .................................. 6-041509

[51] Int. Cl.$^6$ .................................................. H04M 11/00
[52] U.S. Cl. .................................................. 379/93; 379/97
[58] Field of Search .................................. 379/93, 96–100, 379/67, 88, 89, 68; 358/400, 407, 434–439, 442, 468

[56] References Cited

U.S. PATENT DOCUMENTS 5,014,296  5/1991  Saigano .

FOREIGN PATENT DOCUMENTS 0455987  11/1991  European Pat. Off. .
456457   2/1992   Japan .
2211698  7/1989   United Kingdom .
9010989  9/1990   WIPO .

*Primary Examiner*—Wing F. Chan

[57] ABSTRACT

An object of the invention is to provide a communication apparatus for use with a public telephone network, capable of securely obtaining information from an information supplying terminal device. In the apparatus, a plurality of data (DTMF signals) to be transmitted to the information supplying terminal device; a standby time from the end of transmission of the data to the beginning of transmission of the subsequent data; and judgment data representing whether a voice signal from the information supplying terminal device exists after transmission of the data are stored. In the case where on the basis of the judgment data it is judged that a voice signal exists, the data D5 to be subsequently transmitted is transmitted, after the standby time means has been timed and the termination of transmission of a voice signal has been detected in a silent period. On the other hand, in the case where on the basis of the judgment data it is judged that no voice signal exists, data D2 to be subsequently transmitted is transmitted, after the standby time has been timed. Accordingly the communication apparatus is capable of securely transmitting the data corresponding to the voice signal from the information supplying terminal device and receiving the information from the information supplying terminal device.

3 Claims, 13 Drawing Sheets

COMMUNICATION APPARATUS FOR USE WITH PUBLIC TELEPHONE NETWORK

BACKGROUND OF THE INVENTION

1. Field of the Invention

The present invention relates to a communication apparatus for use with a public telephone network, capable of calling an information supplying terminal device which transmits voice signals in response to a call from a calling party side terminal device, recognizes data transmitted from the calling party side terminal device in response to the voice signals, and transmits information specified by the recognized data, in accordance with predetermined transmitting procedures to the calling party side terminal device.

2. Description of the Related Art

Examples of the communication apparatuses for use with a public telephone network are a telephone set, a facsimile machine and the like. A facsimile machine has a function that, after a telephone number has been inputted to call and connect with a receiving party side terminal device, image signals for representing an image to be transmitted is transmitted, or after the facsimile machine has responded to a call from an other side terminal device and has been connected with the public telephone line, image signals received are outputted as an image.

Recently, information supplying services utilizing such communication apparatus with a public telephone network has been developed. For example, Japanese Unexamined Patent Publication JPA 4-56457 (1991) discloses an example such that when information supplying services are utilized, in response to silent periods which separate a plurality of acoustic signals outputted from the information supplying terminal device, data corresponding to the acoustic signals are automatically transmitted from the calling party side terminal device. Such function is utilized, for example, between a bank and its clients, when the client requests counter transactions of the bank at home by transmitting necessary data through the client's own facsimile or telephone set. A program for inputting and processing the data to be transmitted under the communication, the client's telephone number, and a program for processing memory are stored in an integrated circuit (IC) card or the like. When the IC card is connected to a communication apparatus, the data stored in the IC card is read out and transmitted.

FIG. 12 is a timing chart illustrating an example of signals which are transmitted and received by a conventional communication apparatus which is a calling party side terminal device. First, the communication apparatus calls an information supplying terminal device, which is subsequently connected with a public telephone line. Next, a voice message guidance S4 from the information supplying terminal device is received. The voice message guidance S4 tells, for example, "This is . . . Information Service Center. First, push a button of number 9." In response to the voice message guidance S4, the communication apparatus transmits a dual tone modulation frequency (DTMF) signal D7. Further, the communication apparatus receives a voice message guidance S5. The voice message guidance S5 tells, for example, "Please input a desired box number."In response to the voice message guidance S5, the communication apparatus transmits a DTMF signal D8. Still further, the communication apparatus receives a voice message guidance S6. Such signal transmission and reception are repeated predetermined times. When, in response to a last voice message guidance, a DTMF signal is transmitted, the communication apparatus is put into a standby state by using a information supply request button and the like.

For the purpose of automatic data transmission, the DTMF signals D7, D8 are prestored in the communication apparatus. In the case of automatic transmission, when the received voice message guidance S4 has ended and a predetermined silent period N4 has elapsed, the DTMF signal D7 is transmitted. The information supplying terminal device which has received the DTMF signal D7 transmits the voice message guidance S5 after a processing time P5 required for processing the information supplying terminal device has elapsed. Similarly the communication apparatus which has received the voice message guidance S5 transmits the DTMF signal D8, when the voice message guidance S5 has ended and a predetermined silent period N5 has elapsed. The information supplying terminal device which has received the DTMF signal D8 transmits the voice message guidance S6 after a processing time P6 required for processing the information supplying terminal has elapsed.

In such a communication apparatus, whether a voice signal is outputted is judged relying on the intensity of signal. That is, when a signal of a level lower than a predetermined reference level is continuously obtained for a predetermined period, it is judged that no voice signal is outputted, and when a signal of a higher level than the reference level is obtained, it is judged that a voice signal is outputted. Consequently, when the levels of the voice message guidances S4–S6 are lower than the reference, the communication apparatus transmits a DTMF signal, because it is judged as silent in spite of the fact that the communication apparatus has received the voice message guidances S4–S6.

FIG. 13 is a timing chart illustrating an example of signals transmitted and received in false judgment. First, the communication apparatus calls the information supplying terminal device, and the called information supplying apparatus is connected to the public telephone line. Subsequently, the voice message guidance S4 is transmitted from the information supplying apparatus, though, since the signal level of the voice message guidance S4 received by the communication apparatus is low, it is judged as silent in the communication apparatus, and therefore the communication apparatus transmits the DTMF signal D7 when the predetermined silent period N4 has elapsed after confirmation of the connection with the public telephone line. When the DTMF signal D7 has been transmitted and further the predetermined silent period N5 has elapsed, the DTMF signal D8 is transmitted. The information supplying terminal device which has received the DTMF signal D8 transmits the voice message guidance S7 after the processing period P6 required for processing in the information supplying terminal device. Since the data corresponding to the voice message guidance S4 is not inputted, the voice message guidance S7 tells, for example, "Inputted data can not be identified. Please input again."

As mentioned above, such error operation is caused when no voice signal is detected, for example, when the signal level is reduced depending on the states of the communication apparatus, information supplying terminal device, and public telephone line. It is required of an operator to reinput the data every error operation.

Further, an example of the communication apparatus disclosed in above-mentioned Japanese Unexamined Patent Publication JPA 4-56457 (1991) is for counter transactions of banks whose procedures are predetermined, and therefore obtainable information is limited. When other information is further required, it is necessary to call a party associated with the contents of the information and to establish operation procedures corresponding to each content. The example disclosed in JPA 4-56457 can not respond to such needs and the operator is required to conduct each transmission operation by hand. Thus highly troublesome operations are necessary. Further, in the example of JPA 4-56457, prestored operation programs, telephone numbers to be registered, and DTMF signals to be transmitted are stored in an IC card. The IC card is connected to the communication apparatus, and the stored data is read out and processed. However, for example, when specific processing is specified, inputting by the operator himself is necessary. Thus, in the prior art the operations are not completely automated, troublesome and not-automated operations such as pushing a button in the case of necessity remain.

Still further, since the above-mentioned information supplying services utilizes DTMF signals, a case such that information supply can not be carried out is possible when a line for push button(PB) signals is not used for transmitting and receiving signals. Accordingly, for example, when a line for dial pulse (DP) signals is used, the operator must change over the line to the line for PB signals.

SUMMARY OF THE INVENTION

It is hence an object of the invention to provide a communication apparatus for use with a public telephone network, capable of securely obtaining information from an information supplying terminal device.

The invention provides a communication apparatus for use with a public telephone network, capable of calling an information supplying terminal device which transmits an voice signal in response to the call of a calling party side terminal device, recognizes the data transmitted from the calling party side terminal device in response to the voice signal, and transmits the information specified by the recognized data in accordance with predetermined transmission procedures to the calling party side terminal device, the apparatus comprising:

data storing means for storing a plurality of data to be transmitted to the information supplying terminal device, a standby time from the end of transmission of the data to the beginning of transmission of the subsequent data, and judgment data representing whether a voice signal from the information supplying terminal device exists after transmission of the data;

data transmission means for transmitting the data stored in the data storing means to the public telephone line;

timing means for timing the standby time, whose operation is activated immediately after transmission of the data;

detecting means for detecting the termination of transmission of a voice signal from the information supplying terminal device; and control means for reading out the data stored in the data storing means and feeding the data to the data transmission means, the control means providing the data transmission means with data to be subsequently transmitted, after the standby time stored in the data storing means has been timed by the timing means and the termination of transmission of a voice signal has been detected by the detecting means, in the case where it is judged on the basis of the judgment data that a voice signal from the information supplying terminal device exists after the termination of data transmission by the data transmission means; and with data to be subsequently transmitted, after the standby time stored in the data storing means has been timed by the timing means, in the case where it is judged that no voice signal from the information supplying terminal device exists after the termination of data transmission by the data transmission means.

Further, the invention provides a communication apparatus for use with a public telephone network comprising calling means for calling an information supplying terminal device, and changeover means for changing over the connection of the public telephone line from the data transmission means to the calling means and vice versa, wherein the public telephone line is connected to the data transmission means after a calling operation has been terminated by the calling means.

The invention is characterized in that the control means presets communication states corresponding to the transmission procedures of the information supplying terminal device after last data has been transmitted to the information supplying terminal device.

According to the invention, the communication apparatus calls the information supplying terminal device. The called information supplying terminal device transmits a voice signal. The communication apparatus transmits the data in response to the voice signal. The information supplying terminal device transmits information specified by the data in accordance with predetermined transmission procedures. In the communication apparatus are prestored a plurality of data to be transmitted to the information supplying terminal device, a standby time from the end of transmission of the data to the beginning of transmission of the subsequent data, and judgment data representing whether a voice signal from the information supplying terminal device exists after transmission of the data, and whether a voice signal from the information supplying terminal device exists after the data has been transmitted is judged on the basis of the judging data. On the basis of the judgment, the data to be subsequently transmitted is transmitted with the timing corresponding to each judgment.

Consequently, in comparison with the prior art that only the plurality of data to be transmitted to the information supplying terminal device is stored and the data is transmitted when the termination of transmission of the voice signal from the information supplying terminal device is detected, communication with the information supplying terminal device is secured in the communication apparatus of the invention. In other words, in the prior art, when the termination of transmission of the voice signal from the information supplying terminal device is wrongly recognized, for example, when, in spite of existence of a low level voice signal, it is judged because of its low level that no signal exists, data transmission begins. Further, the transmission of the data corresponding to the subsequent voice signal is wrongly carried out with a result that desired information can not be obtained from the information supplying terminal device.

According to the invention, whether a voice signal from the information supplying terminal device exists after data transmission is judged on the basis of the judgment data. When a voice signal exists, the subsequent data is transmitted after timing the stored standby time as well as detection of the end of the voice signal, and when no voice signal exists, the subsequent data is transmitted after timing the stored standby time. Consequently, even when it is judged that, in spite of the existence of a voice signal, the voice signal has ended, unlike the prior art the disadvantageous wrong transmission of data according to the voice signal art is not caused, because the subsequent data is transmitted after the standby time has been timed and the end of the voice signal has been detected. Thus it is made possible to securely obtain desired information from the information supplying terminal device.

Further according to the invention, the communication apparatus for use with a public telephone line comprises calling means and changeover means, wherein the connection of the public telephone line is changed over from the calling means to the data transmitting means by the changeover means after the information supplying terminal device has been called by the calling means.

As a result, the operation of changing over the connection of the public telephone line by an operator is eliminated and the convenience of the communication apparatus for use with a public telephone network is enhanced.

Still further according to the invention, the control means presets a communication state corresponding to the transmission procedures of the information supplying terminal device, after the last data has been transmitted to the information supplying terminal device. The communication state comprises the states of disconnecting from the public telephone line and maintaining the connection with the public telephone line, corresponding to standing by for information from the information supplying terminal device under disconnection with the public telephone line and to standing by for information from the information supplying terminal device under connection with the public telephone line, respectively.

Consequently the communication state can be preset in correspondence to various information supplying terminal devices with a result that information from any information supplying terminal device can be received.

As above-mentioned, whether a voice signal from the information supplying terminal device exists after data transmission has been judged on the basis of the stored judgment data. When it is judged that a voice signal from the information supplying terminal device exists after data transmission, the subsequent data is transmitted after the standby time from the end of transmission of the stored data to the beginning of transmission of the subsequent data has been timed and the end of the voice signal has been detected. On the contrary, when it is judged that no voice signal from the information supplying terminal device exists after data transmission, the subsequent data is transmitted after the standby time has been timed. Consequently the data corresponding to the voice signal is securely transmitted, and desired information can be obtained from the information supplying terminal device.

Further according to the invention, the connection with the public telephone line is changed over from the calling means to the data transmission means. Thus, it is not necessary to change over the connection by an operator, resulting in enhancement of the convenience of the communication apparatus.

Yet further according to the invention, communication states corresponding to the transmission procedures of the information supplying terminal device can be preset after the transmission of the last data to the information supplying terminal device. Accordingly communication states corresponding to various information supplying terminal devices can be preset and information from any information supplying terminal device can be received.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENT

Figure 1:
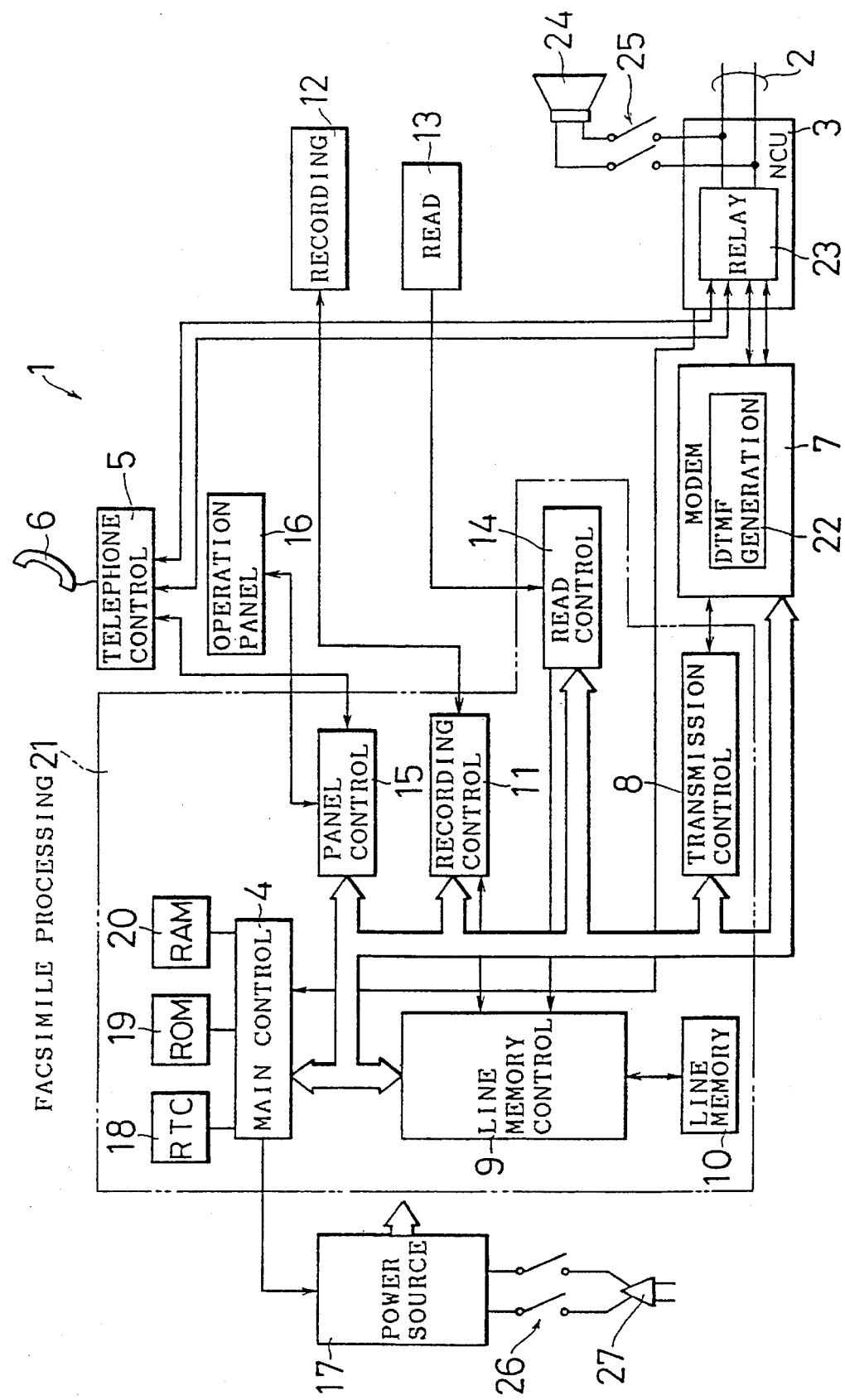
FIG. 1 is an electrical configuration of a facsimile machine 1 showing an embodiment of the invention.

Now referring to the drawings, preferred embodiments of the invention are described below.

FIG. 1 is a block diagram showing an electrical configuration of a facsimile machine of an embodiment of the invention. The facsimile machine 1 transmits and receives voice signals and image signals over a public telephone line 2. The public telephone line 2 is connected to a network control unit (NCU) 3. The NCU 3 is an interface between the public telephone line 2 and the facsimile 1, which controls the connection and disconnection of the public telephone line 2. The NCU 3 judges whether the received signal is a voice signal or an image signal, and transmits the received signal to a main controller 4, if judged as a voice signal, or to a modem 7, if judged as an image signal.

To the NCU 3 is connected a telephone controller 5, independent of a facsimile controller 21 with the below-mentioned configuration. Accordingly the calling partner can speak with the communication partner by the use of a handset 6. Received voice signals are outputted via a speaker of the handset, and voice signals inputted through a microphone of the handset 6 are fed to the NCU 3 via the telephone controller 5 and transmitted from the NCU 3 to the public telephone line 2.

The modem 7 modulates/demodulates image signals on the basis of control of the main controller 4. The modem 7 is provided with a DTMF generator 22 which generates DTMF signals corresponding to pushed ten-keys 31 provided in an operation panel 16 described below. To the modem 7 is connected a transmission controller 8, which controls the modem 7 on the basis of control of the main controller 4 and controls image signal transmission/reception.

To the main controller 4 is connected a line memory 10 via a line memory controller 9, which controls compression of image signals to be transmitted and extension of received image signals by the use of the line memory 10. The main controller 4 feeds the image signals extended by the line memory controller 9 via a recording controller 11 to a recording apparatus 12.

The recording apparatus 12 comprises, for example, a thermal head and a platen roller. Recording operation includes the steps of pressing a recording paper such as thermosensitive paper on the outer circumferential surface of the platen roller by the use of the thermal head, and selectively heating a plurality of thermal resistances arranged in the thermal head on the basis of the given image signals.

Additionally a reader 13 is connected to the main controller 4 via a read controller 14. The reader 13 comprises a light source and a charge coupled device (CCD). The reader 13 irradiates the surface of a document sheet with the light of the light source, reads and converts the light reflected from the document sheet surface to an electrical signal with the CCD, and gives the electrical signal to the read controller 14. The read controller 14 regulates the analog electrical signal read by the CCD to a predetermined level by means of an auto gain control (AGC) circuit and corrects the distortion of an optical system and the dispersion of levels, so-called shading distortion, caused owing to the dispersion of the CCD image sensor sensitivities.

An operation panel 16 is connected to the main controller 4 through a panel controller 15. The operation panel 16 is provided with ten-keys for inputting telephone numbers etc., a plurality of keys and buttons for commanding a process to be carried out by the facsimile 1, and a display panel for displaying an operational condition, set mode etc. of the facsimile 1. The panel controller 15 monitors the input from the various operation keys or buttons of the operational panel 16, or controls the display, and controls the data transfer between the operational panel 16 and the main controller 4. The telephone controller 5 is connected to the panel controller 15 and a telephone number of a receiving party and others can be inputted into the telephone controller 5 by the use of the ten-keys in the operation panel 16 independent of on/off of a power supply in a facsimile processor 21. Thereby the telephone controller 5 outputs a tone signal or PB signal corresponding to the inputted telephone number.

A real time clock (RTC) 18, a read only memory (ROM) 19 and a random access memory (RAM) 20 are connected to the main controller 4. The RTC 18 is a timing means. In the ROM 19 are stored a basic operation program about the entire facsimile machine 1, and an operational program on the basis of the instructions from various operation keys or buttons. The RAM 20 is a memory free to rewrite, which is used as a storage region for registered data etc. or a region for various processes.

Additionally the NCU 3 is provided with a relay 23. The connection of the public telephone line 2 is changed to the telephone controller 5 or the modem 7 by the relay 23. Further a speaker 24 is connected to the public telephone line 2 connected to the NCU 3 through a switch 25. When the connection of the public telephone line 2 is changed to the telephone controller 5 by the relay 23, the switch 25 is not connected and a voice signal received via the public telephone line 2 is outputted from a speaker of the handset 6 connected to the telephone controller 5. On the other hand, when the connection of the public telephone line 2 is changed to the modem 7 by the relay 23, the switch 25 is connected and the voice signal received via the public telephone line 2 is outputted from the speaker 24.

Electric power from a power supply circuit 17 controlled by the main controller 4 is supplied to the facsimile machine 1. A power supply plug 27 is connected to the power supply circuit 17 through a switch 26, and the power supply plug 27 is connected to a plug socket (not shown) to feed the electric power to the power supply circuit 17.

The facsimile processor 21 comprises the main controller 4, transmission controller 8, line memory controller 9, line memory 10, recording controller 11, read controller 14, panel controller 15, RTC 18, ROM 19 and RAM 20.

Figure 2:
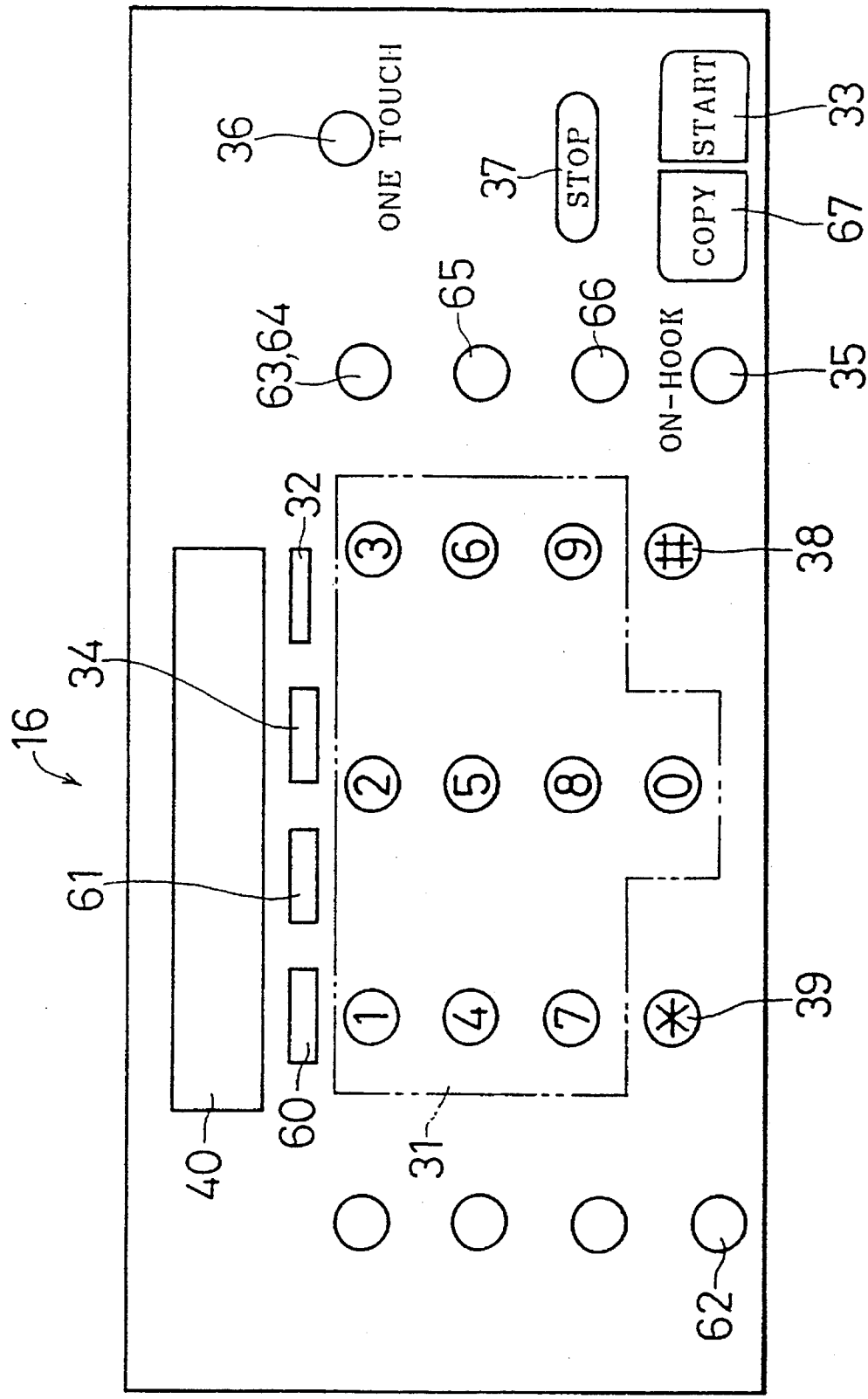
FIG. 2 is a plan view of an operation panel 16 of the facsimile machine 1.

FIG. 2 is a plan view showing the operation panel 16. The operation panel 16 is provided with a plurality of ten-keys 31 corresponding to respective numbers from 0 to 9, a plurality of buttons 32–37, a sharp or pound (#) key 38, and an asterisk (*) key 39 for commanding a process to be carried out by the facsimile machine 1, and a display panel 40 for displaying an operation state and a set mode of the facsimile machine 1. The telephone number of a receiving party is inputted through the ten-keys 31, and codes etc. to be sent in response to a received voice signal are inputted through the ten-key 31, sharp key 38 and asterisk key 39. The registration button 32 is a button for prompting running the process of a set mode. The start button 33 is a button for commanding the start of calling. The information supply request button 34 is a button for commanding the receiving party side terminal device to transmit data as well as for putting the facsimile machine 1 into a state capable of receiving, after connecting to the public telephone line 2. Further facsimile reception can be automatically begun also by pushing the start button 33. The on-hook button 35 is a button for prompting an on-hook operation, that is, a calling operation in a state that a hand set 6 is placed on the facsimile machine 1. The public telephone line 2 is put into an open state by pushing the button 35 to conduct facsimile reception. When the one-touch button 36 is pushed, the data stored in the registration mode is read out and the below-mentioned process is run. Stopping various processes in the midst of running is commanded via the stop button 37. A display panel 40 is realized by, for example, a liquid crystal display device.

The operation panel 16 is further provided with, addition to the above-mentioned keys and buttons, an automatic answering button 60 for selecting a mode from an automatic answering telephone mode where automatic reception is conducted, and an at-home mode where reception is conducted on the basis of operator's instructions; an image quality selection button 61 by which the image quality on facsimile reception, for example, the character size is selected; an abbreviation button 62 for abbreviated dialing, by which the number of a receiving party can be inputted, for example, by pushing only one button; a redialing button 63 for directing that the calling operation is repeated at certain intervals; a pause button 64 for directing to make a pause of inputting a telephone number on calling or registering; a tone button 65 for directing transmission of tone signals to the public telephone line 2; a holding button 66 for directing to hold the public telephone line 2, and a copy button 67 for directing to copy a document.

The facsimile machine 1 with a constitution as described above has a function for automatically transmitting data in response to voice signals from an information supplying terminal device. The function will be described below. Incidentally, the information supplying terminal device is a device which transmits a voice signal in response to a call from a calling party side terminal device, recognizes data transmitted from the calling party side terminal device in response to the voice signals, and transmits information specified by the recognized data to the calling party side terminal device in accordance with predetermined transmission procedures, and the facsimile machine 1 of this embodiment is a communication apparatus capable of calling the information supplying terminal device. First, how to register the data to be transmitted in response to the voice signals from the information supplying terminal device is described.

Figure 3:
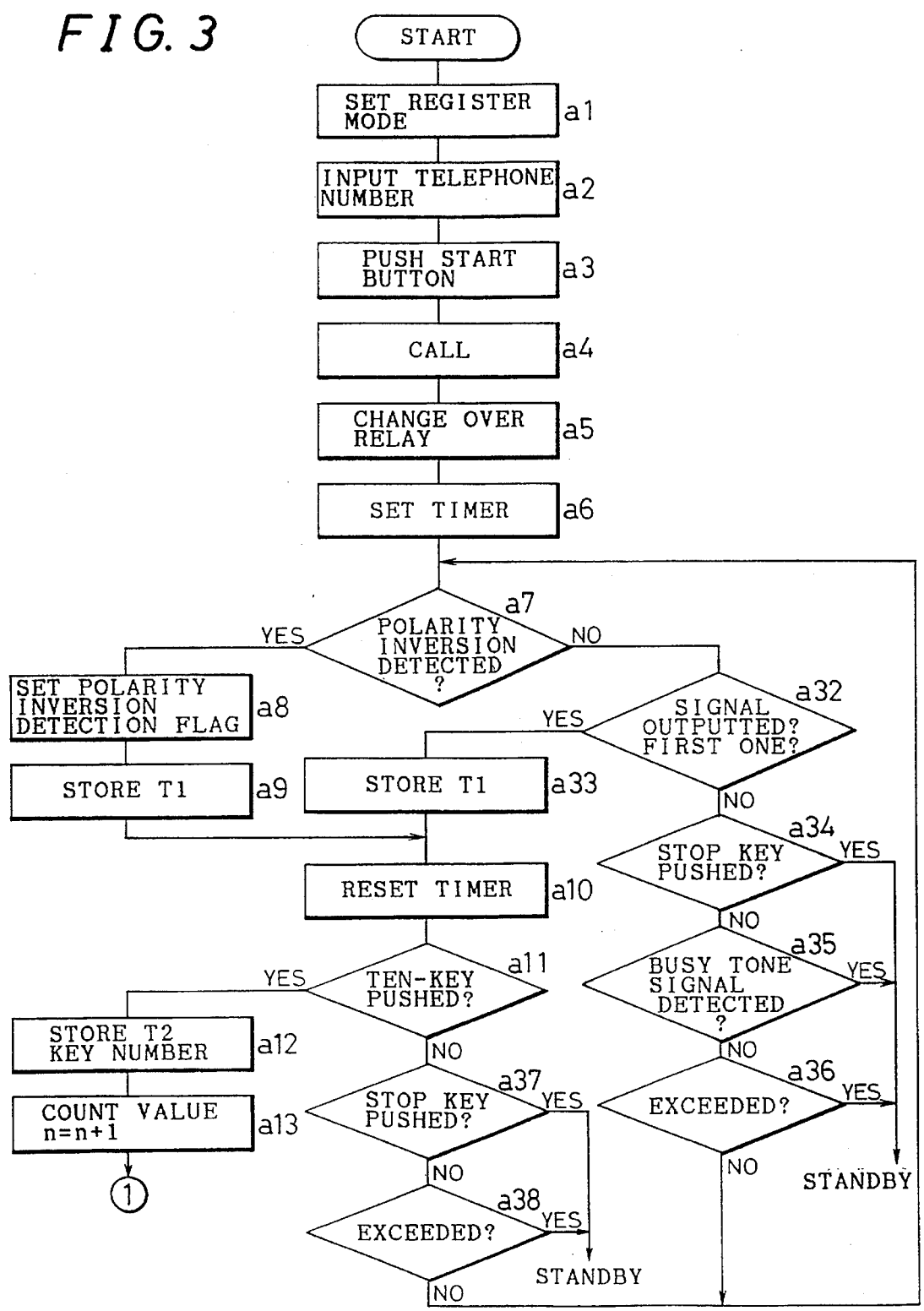
FIG. 3 is a flow chart showing an operation for registering.
Figure 4:
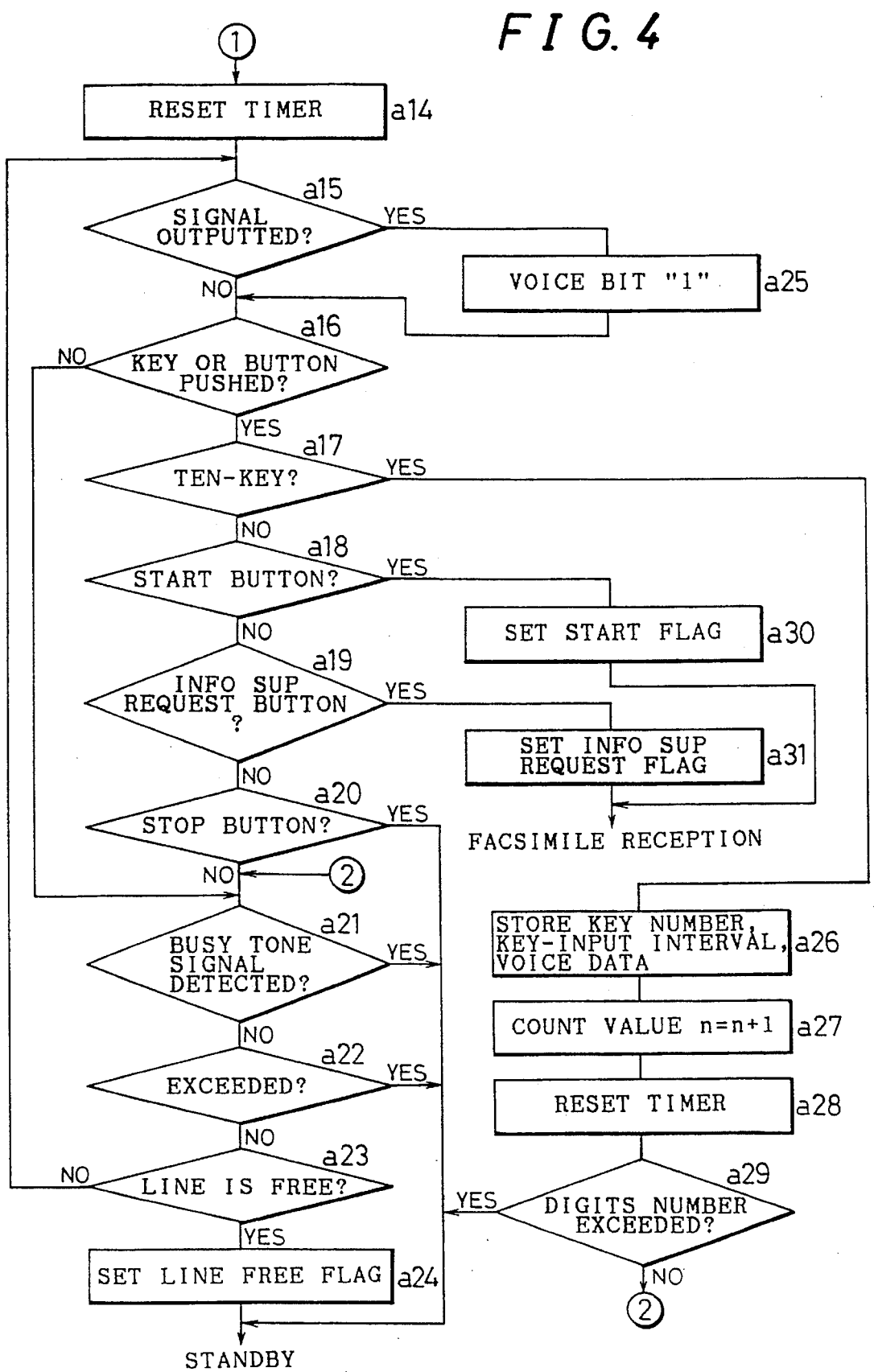
FIG. 4 is a flow chart showing an operation for registering.
Figure 5:
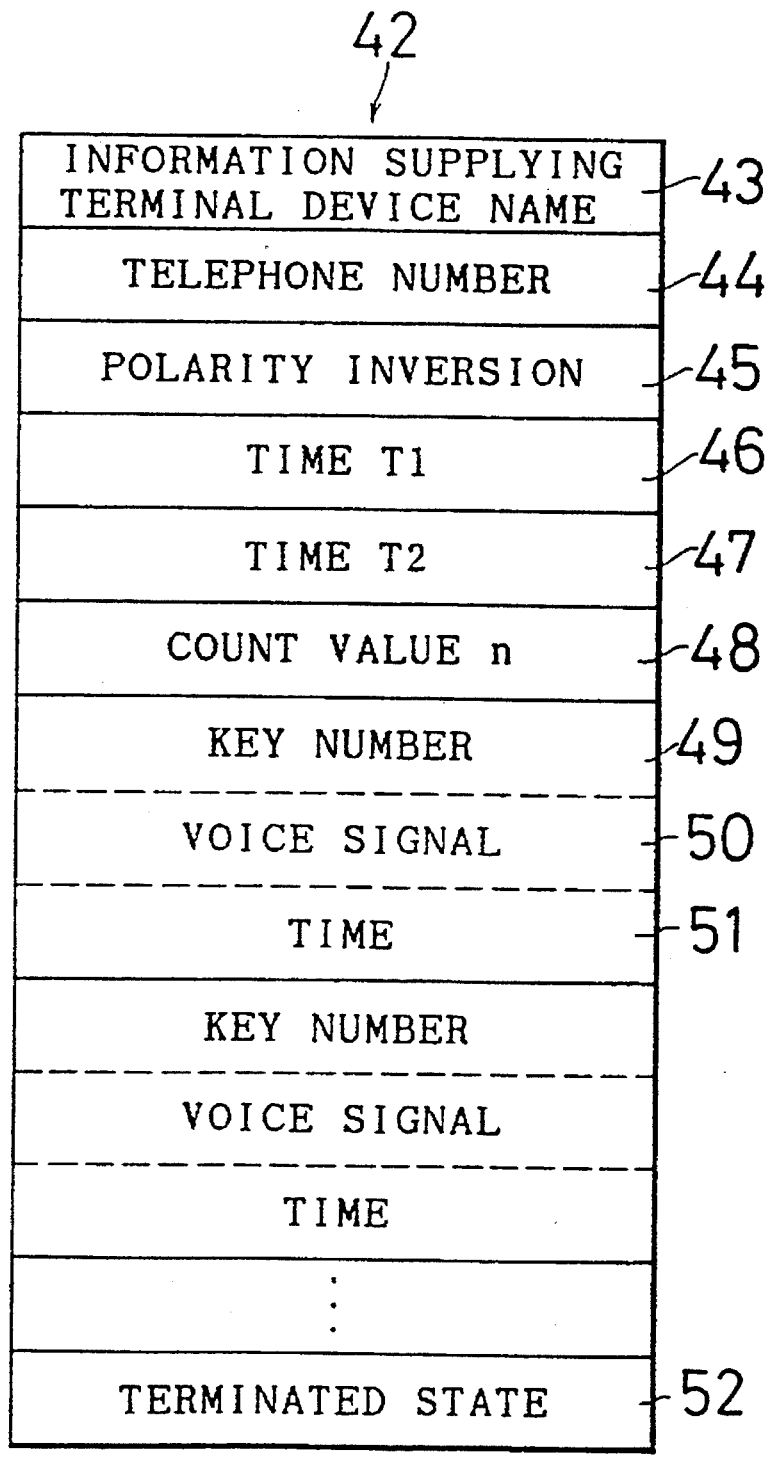
FIG. 5 is a view showing a data storing region 42.

FIGS. 3 and 4 are flow charts showing an operation for registering. FIG. 5 is a view showing a registered data storing region 42. At step a1, a registration mode is set via the registration button 32. At step a2, the telephone number of a desired information supplying terminal device is inputted from the ten-keys 31. The inputted telephone number is stored in a telephone number storing region 44 of the storing region 42. At step a3, the start button 33 is pushed. Thereby it is recognized that input of the telephone number is completed. At step a4, a calling operation is carried out. More specifically, the telephone number inputted from the ten-keys 31 is inputted via a panel controller 15 into a telephone controller 5. The telephone controller 5 into which the telephone number has been inputted transmits a calling signal corresponding to the inputted telephone number to the public telephone line 2 via the NCU 3.

At step a5, changeover of the relay 23 is carried out. That is, the connection of the public telephone line 2 is changed from the telephone controller 5 to the modem 7. At step a6, the period when communication is permitted, prestored in the RAM 20, is read out and set in the RTC 18. At the same time, timing the period is started. The prestored period when communication is permitted is the longest period possible to communicate with the information supplying terminal device, for example, one minute is selected. When the timed period exceeds the prestored period, communication is forcibly stopped. When the timed period frequently exceeds the prestored period, the period when communication is permitted is changed, for example, by changeover of switches provided in correspondence to a plurality of set values prestored.

At step a7, whether polarity inversion has been detected is judged. When detected, the operation advances to step a8, otherwise skipping to step a32. The detection results are stored in a polarity inversion data region 45 within the storing region 42. By detecting the polarity inversion, the closed state of a d.c. circuit between the facsimile machine 1 and the information supplying terminal device is recognized. On the other hand, when the polarity inversion is not detected, whether the ten-key 31 has been pushed is judged at step a11 described below. When the ten-key 31 is judged to have been pushed, it recognized that the d.c. circuit is in the closed state. At step a8, flag is set to indicate that the polarity inversion has been detected. At step a9, a time T1 indicating the termination of calling, namely, the period from the transmission end of the calling signal corresponding to the inputted telephone number to the detection of the polarity inversion is stored in a time T1 region 46 within the storing region 42.

At step a10, the RTC 18 is reset and timing is restarted. At step a11, whether the ten-key 31 has been pushed is judged. When the ten-key 31 is judged to have been pushed, the operation advances to step a12, otherwise skipping to step a37.

At step a12, a time T2 from the detection of the polarity inversion to the push of the ten-key 31 is stored in a time T2 region 47 within the storing region 42. Further, the key number of the pushed ten-key is stored in a key number data region 49 in the storing region 42. At step a13, a count value n is considered as n=n+1, and stored in a count value n region 48 within the storing region 42.

At step a14, the RTC 18 is reset and measurement is restarted. At step a15, whether a signal of a certain value, for example, −43 dB or more has been obtained on the public telephone line continuously for a predetermined period. When obtained, the operation advances to step a25, otherwise skipping to step a16.

At step a16, whether any of the plurality of keys and buttons has been pushed is judged. When pushed, the operation advances to step a17, otherwise skipping to step a21 as described below. At step a17, whether pushed one is the ten-key 31 is judged. When it is judged to be the ten-key 31, the operation advances to step a26, otherwise skipping to step a18.

At step a18, whether pushed one is the start button 33 is judged. When it is judged that the start button 33 has been pushed, the operation skips to step a30, otherwise advances to step a19. At step a19, whether pushed one is the information supply request button 34 is judged. When the information supply request button 34 has been pushed, the operation skips to step a31, otherwise advancing to step a20. At step a20, whether pushed one is the stop button 37 is judged. When the stop button 37 has been pushed, the operation is put in to the standby state, otherwise advancing to step a21.

At step a21, whether a busy tone signal from an exchanger, namely a signal indicating that the information supplying terminal device is in the midst of communicating with other terminal device has been detected is judged. Since the busy tone signal is preset to be of a specified frequency, the busy tone signal can be identified by the frequency of the received signal. When the signal has been detected, the operation is put into the standby state, otherwise advancing to step a22. At step a22, whether the timed period exceeds the period possible to communicate, which is read out at step a6 and set in the RTC 18, namely the longest communication period, is judged. When exceeding, the operation is put into the standby state, otherwise advancing to step a23. At step a23, whether the public telephone line 2 is put into the open state is judged. When the line is judged to be put into the open state, the operation advances to step a24, otherwise returning to step a15. At step a24, a flag is set to indicate that the public telephone line 2 is opened. When the operation at step a24 is completed, the operation is put into the standby state.

At step a25, in response to the judgment that a signal having a value equal to or more than a certain value has been obtained continuously for a predetermined period on the public telephone line, data showing the existence of a voice signal is stored. For example, bit "1" indicates the existence of a voice signal and bit "0" indicates the nonexistence of voice signals. The data is stored in a voice signal data region 50 within the storing region 42. When the operation at step a25 is completed, the operation returns to step a16.

At step a26, in response to the judgment that the ten-key 31 has been pushed at step a17, the key number of the pushed key is stored in the key number data region 49 in the storing region 42. The voice signal data indicating the existence of a voice signal in the period from the pushing of a key to the next pushing of a key is stored in the voice signal data region 50 within the storing region 42. Further a standby period from pushing of a key to the next pushing of a key is stored in a time data region 51 in the storing region 42.

At step a27, the count value n stored in the count value n region 48 within the storing region 42 is considered as n=n+1 and stored once more. At step a28, the RTC 18 is reset and timing is restarted.

At step a29, whether the number of digits inputted from the keys exceeds a predetermined number of digits corresponding to the memory capacity of the RAM 20 is judged. When exceeding, the operation is put into the standby state, otherwise returning to step a21.

At step a30, in response to the judgment that the start button 33 has been pushed at step a18, a flag for indicating that the start button has been pushed is set and the facsimile reception state is ready. At step a31, in response to the judgment that the information supply request button 34 has been pushed at step a19, a flag for indicating the information supply request button 34 has been pushed is set and the facsimile reception state is ready.

When the polarity inversion has not been detected at step a7, the operation skips to step a32. At step a32, whether a signal having a certain value or more is continuously obtained on the public telephone line for a predetermined period and the signal is the first one, namely a ringback tone signal R1 from the information supplying terminal device is received is judged. When received, the operation advances to step a33, otherwise skipping to step a34. At step a33, the period from the termination of calling to the reception of the ringback tone signal R1 is stored as T1 in the time T1 region 46 within the storing region 42. When the operation at step a33 is completed, the operation skips to step a10.

At step a34, whether the stop button 37 has been pushed is judged. When it is judged that the stop button 37 has been pushed, the operation is put into the standby state, otherwise the operation advances to step a35. At step a35, whether a busy tone signal from the exchanger has been detected is judged. When the busy tone signal has been detected, the operation is put into the standby state, otherwise advancing to step a36. At step a36, whether the timed period exceeds the period possible to communicate which is read out at step a6 and set in the RTC18, namely the longest communication period, is judged. When the timed period is judged to exceed, the operation is put into the standby state, otherwise returning to step a7.

When it is judged at step a11 that the ten-key 31 has not been pushed, whether the stop button 37 has been pushed is judged at step a37. When it is judged that the stop button 37 has been pushed, the operation is put into the standby state, otherwise advancing to step a38. At step a38, whether the timed period exceeds the period possible to communicate which is read out at step a6 and set in the RTC18, namely the longest communication period, is judged. When the timed period is judged to exceed, the operation is put into the standby state, otherwise returning to step a7.

When it is judged at step a11 that any ten-key 31 has been pushed and the operation advances to step a12, the time from the reception of the ringback tone signal R1 to the push of the ten-key 31 is stored as T2.

By the above-mentioned registration operations, the registration data as shown in FIG. 5 is generated. The data is stored in the ROM 20. Every input of key number data, the count value n is considered as n=n+1 and restored. Every input, the key number data, voice signal data and time data are stored successively. Lastly, the communication state of the facsimile machine 1 after storing the key number data to be transmitted to the information supplying terminal device has been stored in a termination state data region 52. For example, data indicating whether the state is put into the standby state with or without opening the public telephone line 2 is stored. In a region 43 of data of names of information supplying terminal devices, the name of the terminal device of the receiving party is stored. The name is inputted by an operator, using keys or buttons in the operation panel 16, for example, after termination of the operations mentioned above.

Figure 6:
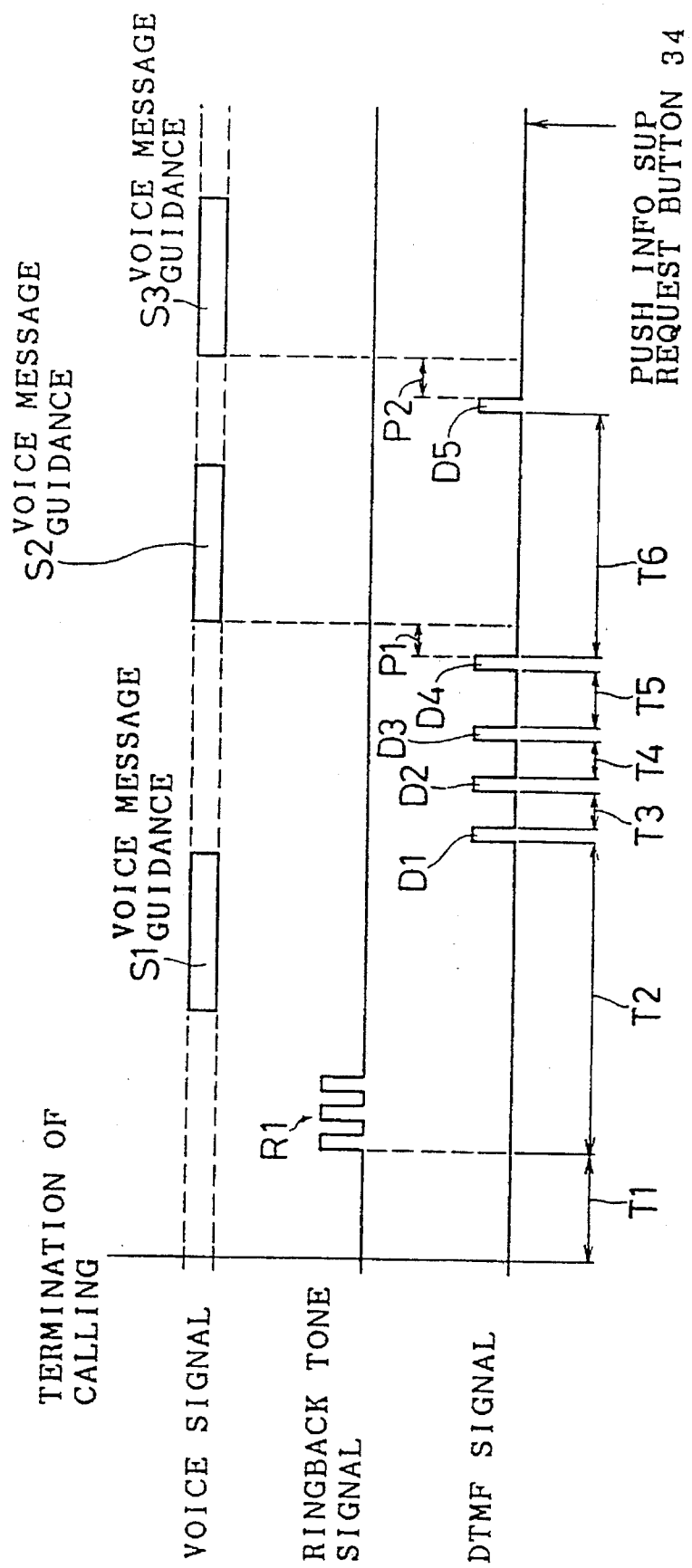
FIG. 6 is a timing chart showing an example of signals transmitted and received in the case where polarity inversion is not detected, on registration.

FIG. 6 is a timing chart showing an example of signals transmitted and received on registration. The timing chart of the figure shows the case where polarity inversion is not detected. When calling from the facsimile machine 1 is terminated, the ringback tone signal R1 from the information supplying terminal device is received. Subsequently, a voice message guidance S1 from the information supplying terminal device is received. The voice message guidance S1 tells, for example, "This is . . . Information Service Center. First, push buttons of number 1, 2, 3, and 4." At the time, the time from the termination of calling to the reception of the ringback tone signal R1 is stored as T1.

A DTMF signal D1 corresponding to "1", a DTMF signal D2 corresponding to "2", a DTMF signal D3 corresponding to "3", and a DTMF signal D4 corresponding to "4" are successively transmitted from the facsimile machine 1. At the time, the time from the reception of the ringback tone signal R1 to the transmission of the DTMF signal D1 is stored as T2. Additionally, the contents of the DTMF signals D1–D4, namely a key number and standby times T3–T5 are stored. The standby time T3 indicates the period from the transmission of the DTMF signal D1 to the transmission of the DTMF signal D2, the standby time T4 indicates the period from the transmission of DTMF signal D2 to the transmission of DTMF signal D3, and the standby time T5 indicates the period from the transmission of the DTMF signal D3 to the transmission of the DTMF signal D4. Further voice signal data in the standby time from the transmission of a DTMF signal to the transmission of the following DTMF signal is also stored. In this case it is stored that there exist no voice signals. Namely, the voice bit is stored as "0". More specifically, the DTMF signal D1, the voice bit "0", the standby time T3, the DTMF signal D2, the voice bit "0", the standby time T4, DTMF signal 3, the voice bit "0", the standby time T5, and DTMF signal D4 are stored in this order.

A voice message guidance S2 from the information supplying terminal device is received, after a time P1 required for the process of the information supplying terminal device has elapsed after the transmission of the DTMF signal D4. The voice message guidance S2 tells that, for example, "Please input your desired BOX number." Subsequently, a DTMF signal D5 corresponding to the desired BOX number is transmitted from the facsimile machine 1. At the time, the contents of the DTMF signal D5, namely the key number, a standby time T6 from the transmission of the DTMF signal D4 to the transmission of the DTMF signal D5, and voice signal data in the standby time T6 are stored. In the case, it is stored that there exists any voice signal. Namely, the voice bit is considered as "1", more specifically, the voice bit "1", the standby time T6, and DTMF signal D5 are stored in this order following the DTMF signal D4.

A voice message guidance S3 from the information supplying terminal device is received, after a time P2 required for the process of the information supplying terminal device has elapsed after the transmission of the DTMF signal D5. The voice message guidance S3 tells that, for example, "Please push the start button or information supply request button." Thereby, for example, if the information supply request button 34 of the facsimile machine 1 is pushed, the data requested to be transmitted is stored as data in a termination state. At the time, following the DTMF signal D5, the voice bit "1" showing the existence of a voice signal is stored. Additionally, at the time, since timing the lime is not carried out at the time, the time data are not stored.

Figure 7:
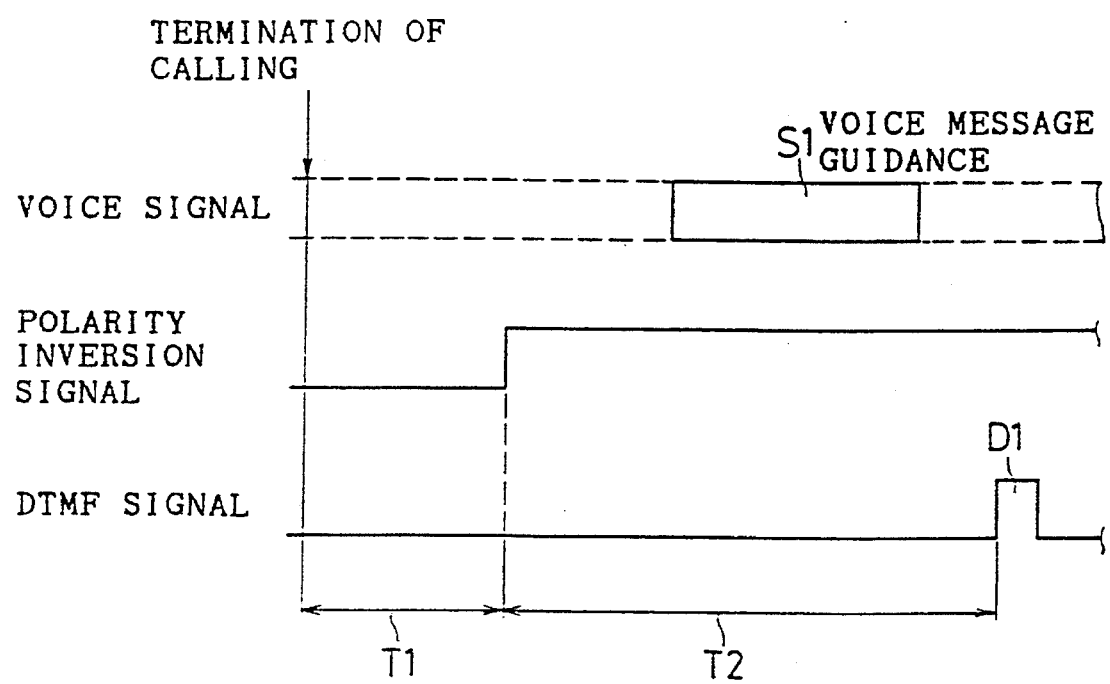
FIG. 7 is a timing chart showing a signal transmitted and received in the case where polarity inversion is detected, on registration.

FIG. 7 is a timing chart showing signals transmitted and received on registration in the case of polarity inversion detection. In the case of polarity inversion detection, the time from the termination of calling to the polarity inversion detection is stored as T1, and further the time from the polarity inversion detection to the transmission of the DTMF signal D1 is stored as T2. After this the DTMF signals D1–D5, standby times T3–T6 and voice signal data are stored.

Figure 8:
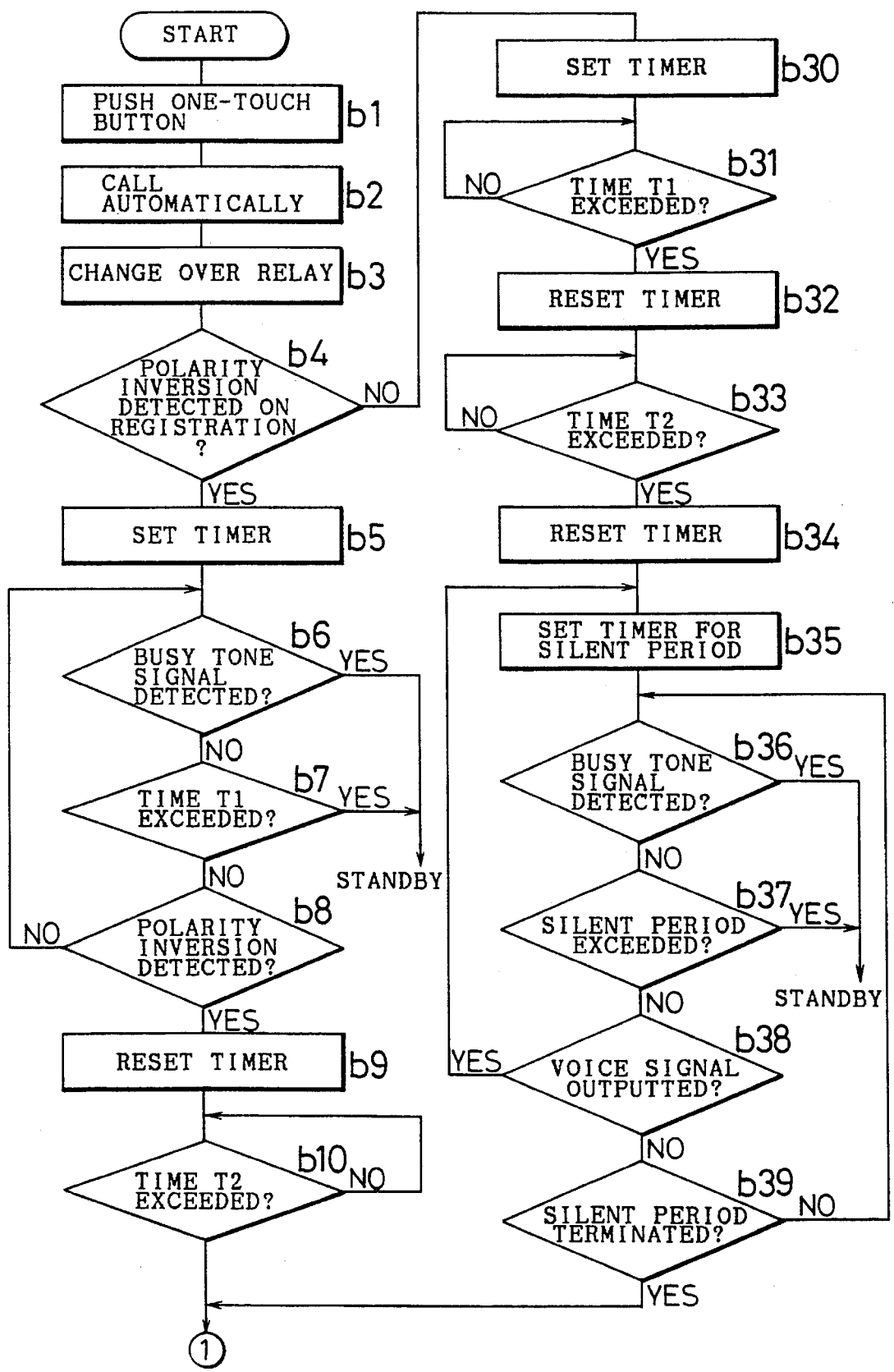
FIG. 8 is a flow chart showing operations on signal transmission.
Figure 9:
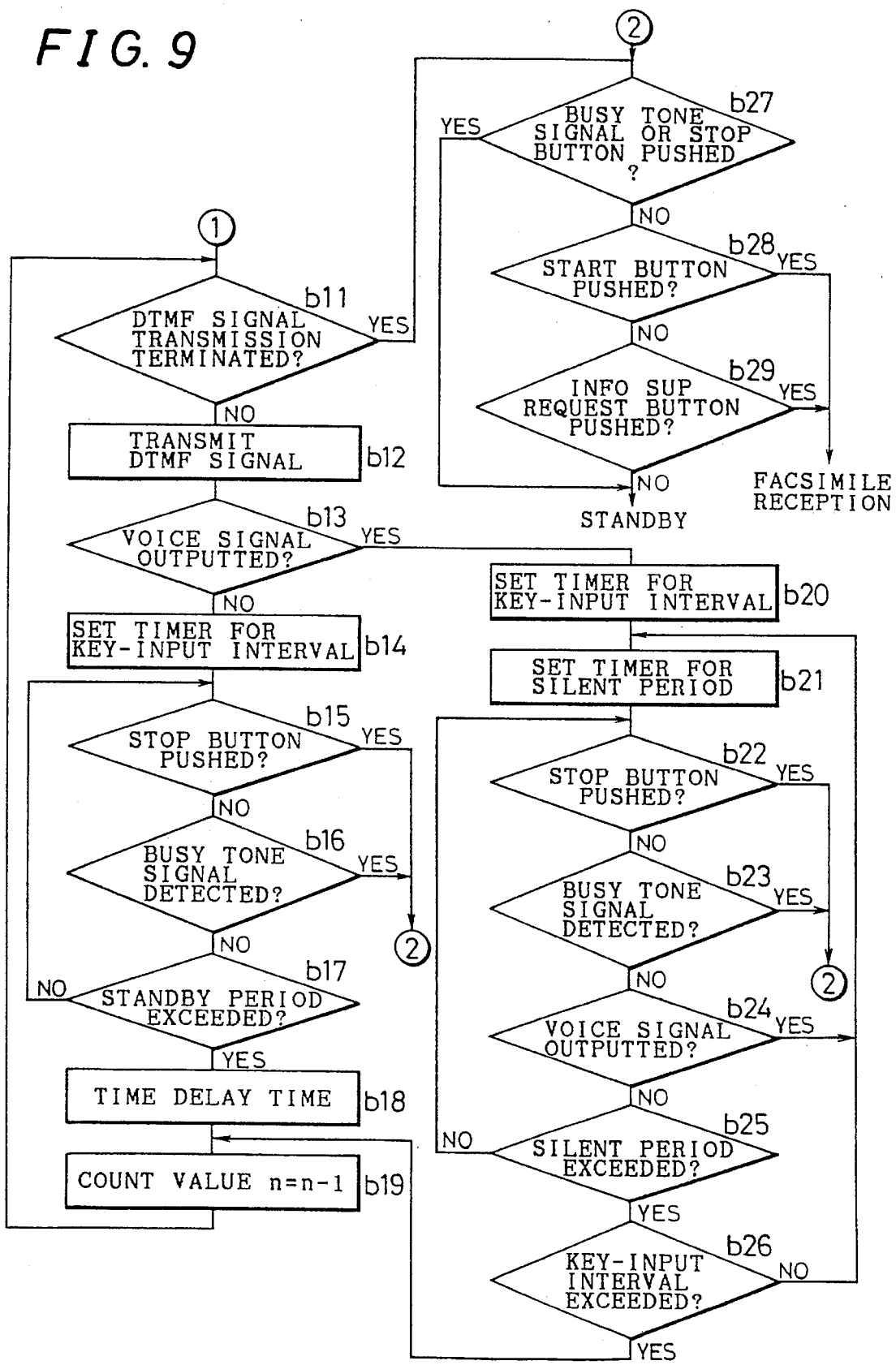
FIG. 9 is a flow chart showing operations on signal transmission.

FIGS. 8, 9 are flowcharts showing an operation on transmitting a signal. At step b1, the one touch button 36 is pushed. Thereby the contents in the storing region 42 is read out. Also the data of the name of the information supplying terminal is displayed on a display panel 40. At step b2, calling is automatically carried out. At the time the contents in the telephone number data region 44 within the storing region 42 is read out, and calling is carried out on the basis of the read-out data. At step b3, the relay 23 is changed over.

At step b4, the contents in the polarity inversion data region 45 within the storing region 42 is read out and whether polarity inversion has been detected is judged. When it is judged that the polarity inversion has been detected, the operation advances to step b5, otherwise skipping to step b30. At step b5, the period when communication is permitted, namely the longest communication period, prestored in the RAM 20 is read out to set in the RTC 18, and timing the period is started. At step b6, whether the busy tone signal from the exchanger has been detected is judged. When it is judged that the signal has been detected, the operation is put into the standby state, otherwise advancing to step b7. At step b7, whether the start time of the timing at step b5 is beyond the time T1 from the termination of calling to the polarity inversion detection is judged. When it is judged to be beyond the time, the operation is put into the standby state, otherwise advancing to step b8. At step b8, whether the polarity inversion has been detected is judged. When it is judged to have been detected, the operation is put into step b9, otherwise returning to step b6.

At step b9, the RTC 18 is reset, and measurement is restarted. At step b10, whether the time of start of the measurement at step b9 exceeds the time T2 which is timed in the case where the polarity inversion is detected on registration, namely the period from the polarity inversion detection to the transmission of the DTMF signals is judged. When it is judged to exceed, the operation advances to the step b11, otherwise being in a standby state at step b10.

At step b11, the contents in the count value n region 48 within the storing region 42 are read out, whether DTMF signals of a number corresponding to the contents have been transmitted is judged. When it is judged to be transmitted, the operation skips to step b27, otherwise advancing to step b12. At step b12, the contents in the key number data region 49 within the storing region 42 are read out, and the DTMF signals corresponding to the contents are transmitted. At step b13, the contents in the voice signal data region 50 within the storing region 42 are read out and whether voice signal data exists is judged. When it is judged to exist, the operation skips to step b20, otherwise advancing to step b14. At step b14, the standby time in the time data region 51 in the storing region 42 is read out and timing the standby time is started.

At step b15, whether the stop button 37 has been pushed is judged. When it is judged to have been pushed, the operation skips to step b27, otherwise advancing to step b16. At step b16, whether the busy tone signal from the exchanger has been detected is judged. When it is judged to have been detected, the operation skips to step b27, otherwise advancing to step b17. At step b17, whether the time timed exceeds the standby time read out at step b14 is judged. When it is judged to exceed, the operation advances to step b18, otherwise returning to step b15.

At step b18, the predetermined delay time is read out, and timing the delay time is carried out. By further adding the delay time to the standby time timed on registration and stored in the time data region 51 in the storing region 42, communication never becomes impossible, even when a difference between times of start of timing at step b14 and start of timing on registration. Consequently, there is sufficient time to response. At step b19, the count value n stored in the count value n region 48 within the storing region 42 is read out and the count value n is considered as n=n−1. When the operation of step b19 is completed, returning to step b11.

When, at step b13, voice signal data is judged to exist, the operation advances to step b20. At step b20, the standby time stored in the time data region 51 in the storing region 42 is read out and as well as timing the standby time is conducted. At step b21, timing a prestored silent period is started. It is judged as silent when no signal having a certain level, for example, −43dB or more, has been continuously obtained on the public telephone line for a predetermined period. At step b21, the silent period is timed over a predetermined period. At step b22, whether the stop button 37 has been pushed is judged. When the stop button 37 is judged to have been pushed, the operation skips to step b27, otherwise advancing to step b23. At step b23, whether a busy tone signal from the exchanger has been detected is judged. When the busy tone signal is judged to have been detected, the operation skips to step b27, otherwise advancing to step b24.

At step b24, whether a voice signal exists on the public telephone line is judged. When a voice signal is judged to exist, the operation returns to step b21, otherwise advancing to step b25. At step b25, whether the time timed at step b21 exceeds the silent period is judged. When the time is judged to exceed, the operation advances to step b26, otherwise returning to step b22. At step b26, whether the time whose timing has been started at step b20 exceeds the read-out standby time is judged. When the time is judged to exceed the standby time, the operation skips to step b19, otherwise the operation returns to step b21.

At step b27, whether a busy tone signal from the exchanger has been detected or whether the stop button 37 has been pushed is judged. When the busy tone signal is judged to have been detected or the stop button 37 is judged to have been pushed, the operation is put into the standby state, otherwise advancing to step b28. At step b28, whether the start button 33 has been pushed is judged. When the start button 33 is judged to have been pushed, the operation is put into the facsimile reception state, otherwise advancing to step b29. At step b29, whether the information supply request button 34 has been pushed is judged. When the information supply request button is judged to have been pushed, the operation is put into the facsimile reception state, otherwise being put into the standby state.

At step b4, when the polarity inversion detection is judged to have not been carried out, the operation advances to step b30. At step b30, the period when communication is permitted, prestored in the RAM20, namely the longest communication time is read out to set in the RTC18, and as well as timing is started. At step b31, whether the time when timing has been started at step b30 exceeds the time T1 stored in the case where the polarity inversion has not been detected on registration, namely the period from the calling termination to the detection of the ringback tone signal R1, is judged. When the time is judged to exceed, the operation advances to step b32, otherwise being put into the standby state at step b31.

At step b32, the RTC 18 is reset, and timing is restarted. At step b33, whether the time when timing has been started at step b32 exceeds the time T2 stored on the case where the polarity inversion has not been detected on registration, namely the period from the detection of the ringback tone signal R1 to the transmission of the DTMF signals, is judged. When the time is judged to exceed, the operation advances to step b34, otherwise being put into standby at step b33.

At step b34, the RTC 18 is reset. At step b35, timing a prestored silent period is started. At step b36, whether the detection of the busy tone signal from the exchanger has been carried out is judged. When the detection is judged to have been carried out, the operation is put into the standby state, otherwise advancing to step b37. At step b37, whether the time timed at step b35 exceeds the silent period is judged. When the time is judged to exceed, the operation is put into the standby state, otherwise advancing to step b38.

At step b38, whether a voice signal exists on the public telephone line is judged. When a voice signal is judged to exist, the operation returns to step b35, otherwise advancing to step b39. At step b39, whether the silent period has been terminated is judged. When the silent period is judged to have been terminated, the operation returns to step b11, otherwise returning to step b36.

Figure 10:
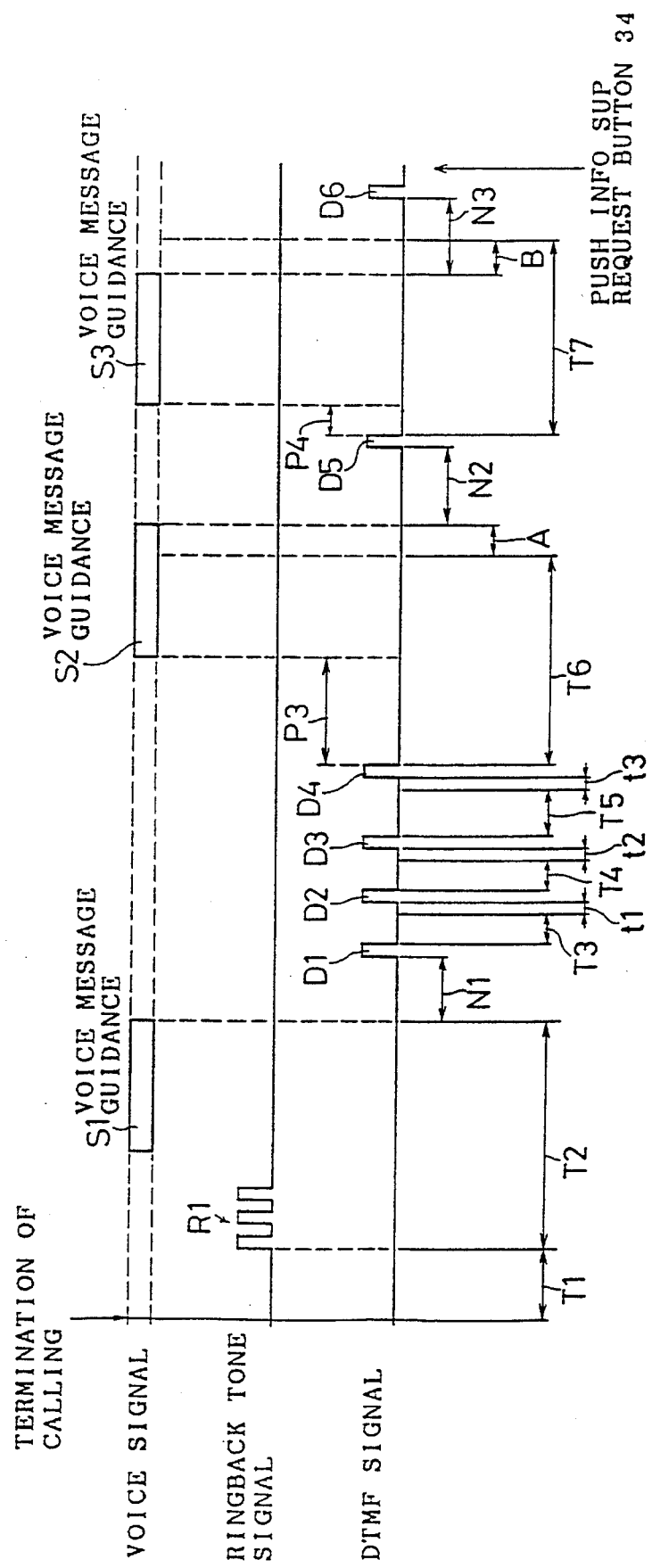
FIG. 10 is a timing chart showing an example of signals transmitted and received in the case where polarity inversion is not detected, on signal transmission.

FIG. 10 is a timing chart showing signals transmitted and received on calling. The timing chart shown in the figure represents a case where the polarity inversion detection is not carried out. When calling from the facsimile machine 1 is terminated, namely the transmission of the calling signal is terminated, the ringback tone signal R1 from the information supplying terminal device is received. At the time, the time T1 stored on registration, namely the period from the termination of calling to the detection of the ringback tone signal R1, is timed. Subsequently the voice message guidance S1 from the information supplying terminal device is received. At the time, the time T2 stored on registration, namely the period from the detection of the ringback tone signal R1 to the transmission of the DTMF signals is timed. The facsimile machine 1 transmits the DTMF signal D1 after the voice message guidance S1 has been completed and a silent period N1 has elapsed.

The DTMF signal D2 is transmitted when the DTMF signal D1 has been transmitted and the standby time T3 stored on registration and delay time t1 have passed after the silent period N1. Further the DTMF signal D3 is transmitted when the standby time T4 stored on registration and delay time t2 have elapsed. In the similar fashion, when the standby time T5 stored on registration and delay time t3 have elapsed, the DTMF signal D4 is transmitted.

The voice message guidance S2 is received when the processing time P3 of the information supplying terminal device has elapsed after the transmission of the DTMF signal D4. At the time, the standby time T6 after the transmission of the DTMF signal D4, which is stored on registration, is timed.

For example, as shown in FIG. 10, in the case where the voice message guidance S2 has not been terminated, though the standby time T6 has elapsed, the DTMF signal D5 is transmitted when the voice guidance S2 has been terminated and the silent period N2 has elapsed. Additionally, a standby time T7 after the transmission of the DTMF signal D5, which is timed on registration. The information supplying terminal device which has received the DTMF signal D5 transmits the voice message guidance S3 after the processing P4 has elapsed. At the time, for example, as shown in FIG. 10, in the case where the voice message guidance S3 is terminated before the standby time T7 elapses, the DTMF signal D6 is transmitted when the voice message guidance S3 has been terminated and the silent period N3 has elapsed. Namely, in the embodiment, timing a standby time after the transmission of DTMF signals has been carried out and stored. In the case where the voice signal is longer by a period A than the stored standby time, the DTMF signal is transmitted after the voice signal and the silent period have terminated. Also in the case where the voice signal is shorter by a period B than the stored standby time, the DTMF signal is transmitted after the voice signal and silent period have terminated.

When a last DTMF signal is transmitted to the information supplying terminal device, the facsimile machine 1 is put into the facsimile reception state.

Figure 11:
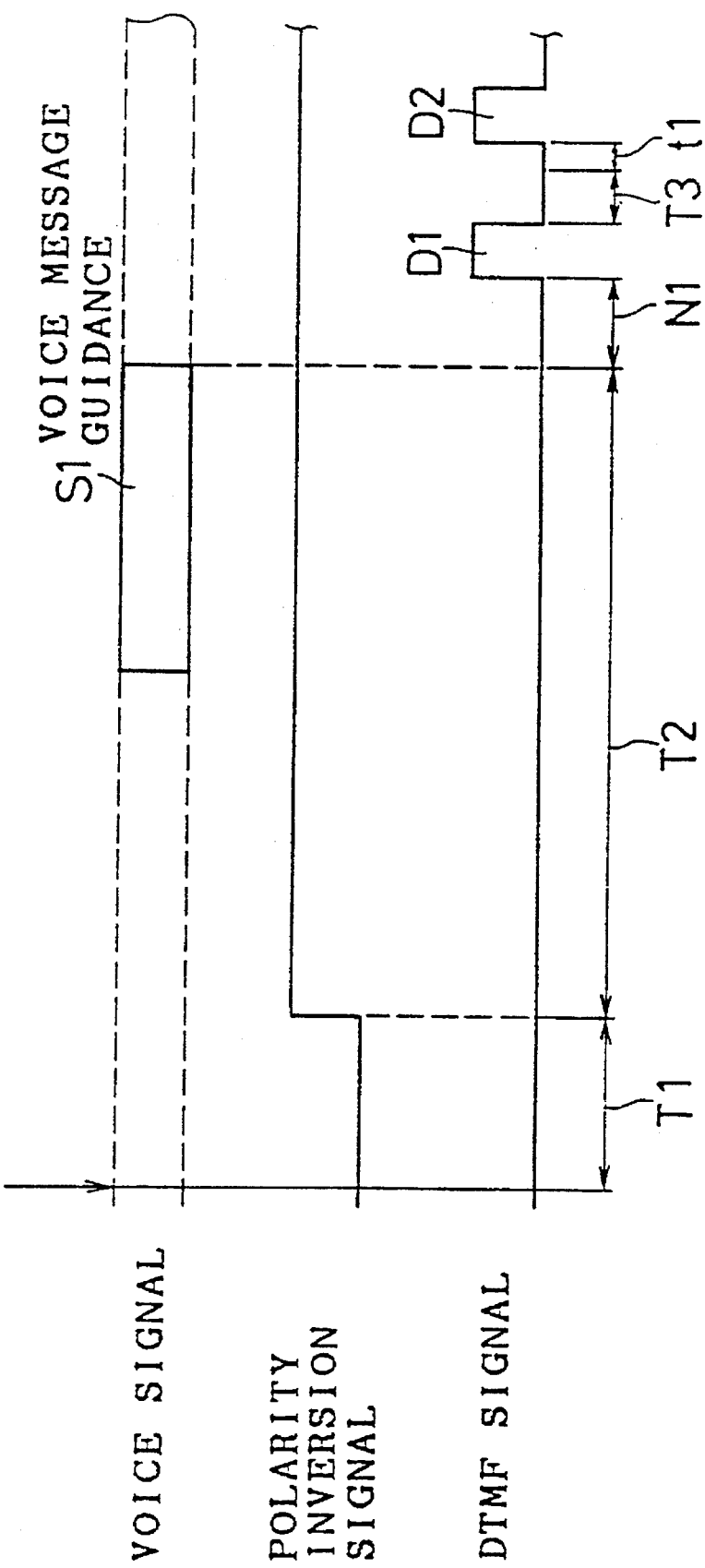
FIG. 11 is a timing chart showing a signal transmitted and received in the case where polarity inversion is detected, on signal transmission.
Figure 12:
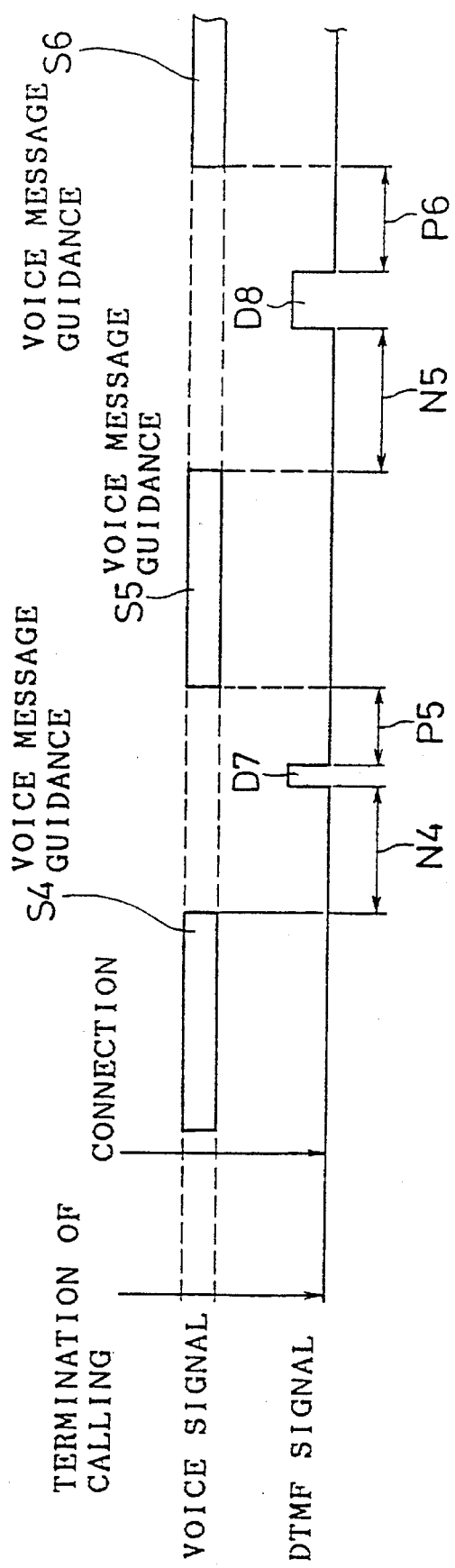
FIG. 12 is a timing chart showing an example of signals transmitted and received by a conventional communication apparatus.
Figure 13:
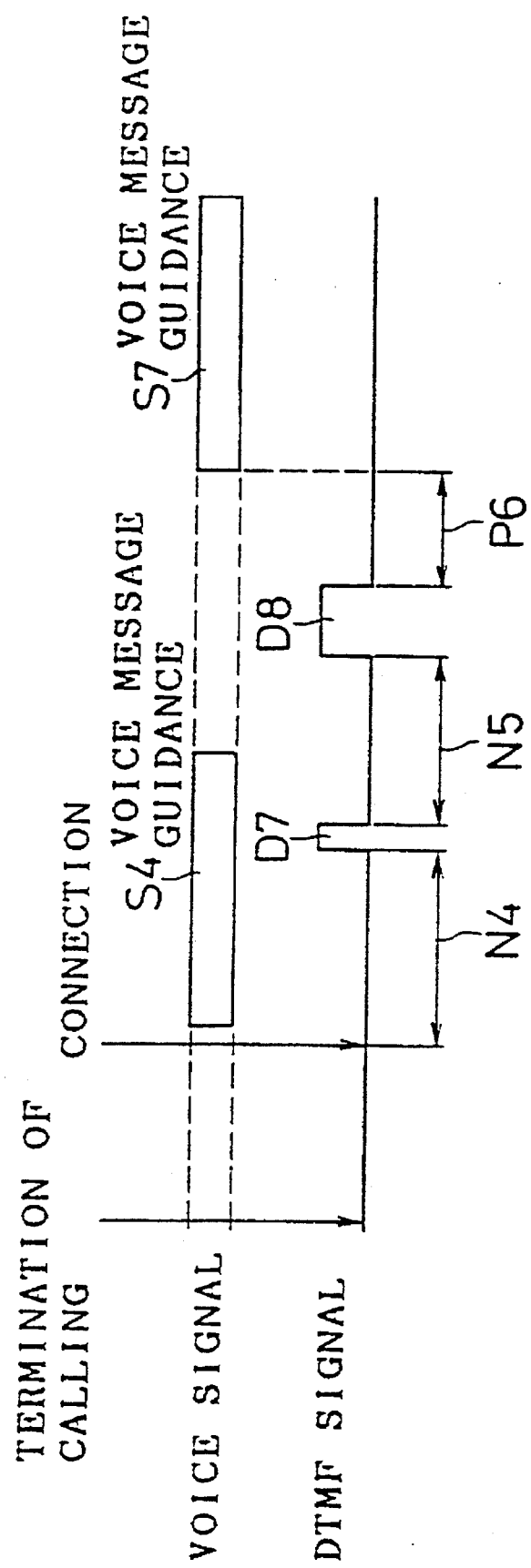
FIG. 13 is a timing chart showing a signal transmitted and received when wrongly recognized.

FIG. 11 is a timing chart showing a signal transmitted and received in the case where polarity inversion is detected, on transmitting a signal. In the case, the period from the termination of calling to the detection of polarity inversion is stored as T1 and timing the time T1 is started on the termination of calling. The time from the detection of polarity inversion to the transmission of the DTMF signal D1 is stored as T2 and timing the time T2 is started on the detection of polarity inversion. While the time T2 is timed, the voice message guidance S1 is received. After this, data is transmitted in the similar fashion described above.

As described above, whether a voice signal exists is judged on the basis of the voice signal data. When a voice signal exists, the following DTMF signal is transmitted after a standby time till the transmission of the following DTMF signal has been timed and a silent period has elapsed. Otherwise the following DTMF signal is transmitted after the standby time and delay time have elapsed.

Consequently, it is made possible to securely transmit the DTMF signal corresponding to a voice message guidance from the information supplying terminal device and obtain desired information from the information supplying terminal device. Further, since the connection of the public telephone line 2 is changed over to the modem 7, the change over operation of the public telephone line 2 by an operator is eliminated and the convenience of the communication apparatus for use with the public telephone line 2 is enhanced. Still further, the data of a termination state is stored and the termination state is set after the transmission of the last DTMF signal. As a result, various information from any information supplying terminal device can be received.

Though, in the embodiment, an example of a facsimile machine is described, the invention is not limited to a facsimile machine and a communication apparatus utilizing a public telephone network is also included in the scope of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication apparatus for use with a public telephone network, capable of calling an information supplying terminal device which transmits a voice signal in response to the call of a calling party side terminal device, recognizes the data transmitted from the calling party side terminal device in response to the voice signal, and transmits the information specified by the recognized data in accordance with predetermined transmission procedures to the calling party side terminal device, the apparatus comprising:

data storing means for storing a plurality of data to be transmitted to the information supplying terminal device, a standby time from the end of transmission of the data to the beginning of transmission of the subsequent data, and judgment data representing whether a voice signal from the information supplying terminal device exists after transmission of the data;

data transmission means for transmitting the data stored in the data storing means to the public telephone line;

timing means for timing the standby time, whose operation is activated immediately after transmission of the data;

detecting means for detecting the termination of transmission of a voice signal from the information supplying terminal device; and control means for reading out the data stored in the data storing means and feeding the data to the data transmission means, the control means providing the data transmission means with data to be subsequently transmitted, after the standby time stored in the data storing means has been timed by the timing means and the termination of transmission of a voice signal has been detected by the detecting means, in the case where it is judged on the basis of the judgment data that a voice signal from the information supplying terminal device exists after the termination of data transmission by the data transmission means; and with data to be subsequently transmitted, after the standby time stored in the data storing means has been timed by the timing means, in the case where it is judged that no voice signal from the information supplying terminal device exists after the termination of data transmission by the data transmission means.

2. The communication apparatus of claim 1, further comprising calling means for calling an information supplying terminal device, and changeover means for changing over the connection of the public telephone line from the data transmission means to the calling means and vice versa, wherein the public telephone line is connected to the data transmission means after a calling operation has been terminated by the calling means.

3. The communication apparatus of claim 1 or 2, wherein the control means presets communication states corresponding to the transmission procedures of the information supplying terminal device after last data has been transmitted to the information supplying terminal device.

* * * * *